(No Model.)
W. G. DAVIS.
PNEUMATIC TUBE.
No. 297,505. Patented Apr. 22, 1884.
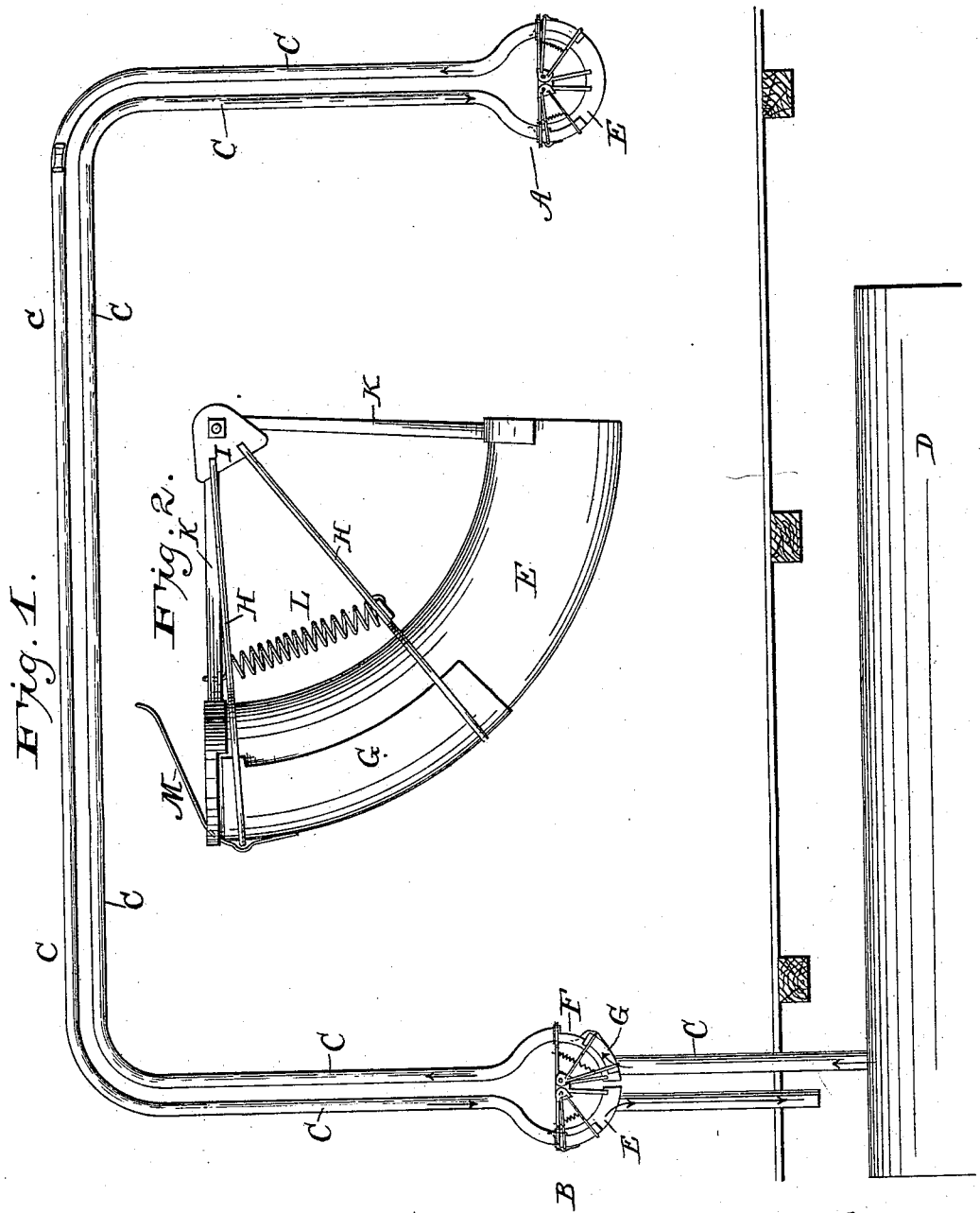

UNITED STATES PATENT OFFICE.

WILBUR G. DAVIS, OF SYRACUSE, NEW YORK.

PNEUMATIC TUBE.

SPECIFICATION forming part of Letters Patent No. 297,505, dated April 22, 1884.

Application filed January 3, 1884. (No model.)

*To all whom it may concern:*

Be it known that I, WILBUR G. DAVIS, a citizen of the United States, residing at Syracuse, in the county of Onondaga and State of New York, have invented certain new and useful Improvements in Pneumatic Tubes, of which the following is a specification, reference being had therein to the accompanying drawings.

My invention relates to improvements in pneumatic tubes, and in the devices for receiving and discharging the parcels to be conveyed therein; and the object of my invention is to provide a more simple and reliable means for the conveyance of the carriers and other parcels from one point to another.

To this end my invention consists in making the pneumatic tubes of glass, the advantages of which will be more fully hereinafter set forth.

My invention consists, further, in providing the curved tubes, or ends which connect the ends of the double or twin tubes, with certain devices for opening and closing egress and ingress ports for the discharge and reception of the carriers, so that a single current of air is all that is necessary to convey parcels to or from the station.

Figure 1 is a side view of my pneumatic system showing the stations and devices for opening and closing the ports. Fig. 2 is a side elevation, drawn to a larger scale, of one of the devices for opening and closing the ports.

The tubes which have heretofore been employed in conveying parcels by pneumatic pressure have been made of brass, copper, or from other opaque substances. These tubes tend to darken the apartment; and, furthermore, the cash-conveying box or car is liable to become fast at some point in the tube, and this necessitates the taking down of the tubes and a search being made in order to find out where the stoppage is, and much trouble and annoyance are experienced beside the expenditure of time and labor thus occasioned. I obviate this by making the tubes of glass. These do not obstruct the light; and should the parcel or cash box become clogged therein, it is but a moment's work to find the exact point of obstruction, and repairs can be made at once. Further advantages might be urged in favor of the glass tubes. Suffice it to say that there is less friction to overcome by the infringement of the cash boxes or carriers on the inside of such tubes than there is in tubes as generally made of other material; and, furthermore, tubes made of glass are much more attractive to the eye, and give a finished and elegant appearance to the apartment.

Referring to the drawings, in Fig. 1 I have shown a system of glass pipes, or rather a continuous pipe, arranged to convey the cash-carriers from the station A to the station B, or cashier's desk, and return the same to the salesman at station A.

It will be noticed that the pipe or pneumatic tube C is one continuous line of pipe, and leads from the compression-chamber D to the station B, and thence to the station A, where it curves around and is then returned to the station B, from which it passes into the basement; or it may terminate in the store or apartment, so that the air-current escaping from the open end of the pipe may be used to advantage in ventilating the apartment.

E E are curved portions of the pipe or tube which form the bends at or near the terminals of the tube, in which are cut the openings F, by means of which access is had to the interior of the tube to place therein the cash-carrier or other package. The openings F are closed by a slide or door, G, which is semi-cylindrical in cross-section and is adapted to fit snugly on the sections E E. The slide or door G is supported or held against the sides of the sections E by means of metallic rods H H, which are passed around the said slides or doors and secured thereto in any suitable manner. The ends of the rods are secured to a plate, which is pivoted to the bars K K, said bars being secured to the tube in any suitable manner so as to be of sufficient strength to resist the shock of the carrier or package.

L is a spiral spring, one end of which is secured to the upper bar, K, and the other end to the lower rod, H, so that when the slide or door G is opened the force of the spring will return it again to a closed position.

M is a strap-spring, one end of which is secured to the outside of the slide G, while the other end projects into the tube, passing through opening F, so as to lie in the path of the carrier and be struck by it in its passage through the tube. The blow exerted on the spring M by the carrier forces the slide back and permits the carrier to fall out into a basket or other receptacle. The spring M also serves as a support for the carrier while the same is being placed in the tube.

When it is desired to send a carrier from one station to another, the slide is drawn back by hand and the carrier inserted, one end of which is placed against the spring M and the slide or door G closed. The carrier, by the action of the air-current within the tube, is then taken at once to its destination.

As before indicated, the tubes C are made of glass, so that any number of said pipes may be arranged within the apartment without obstructing the light. The tube is made up of sections of any convenient length, so that if the carrier should become clogged within the tube it can be readily removed without having to take down the whole line of tubing. The tubes may have a continuous current of air passing through them during business hours; or suitable devices may be employed to shut off the current of air from the pressure-chamber, the pressure of the air within the tube being exerted only when a carrier is to be passed through the tube.

In practice, I may have the tubes connected to the pressure-chamber at the various stations, and have the return-pipe bent at or below the cashier's desk, and I may arrange the entrance and exit ports on straight sections of the tube, so as to obviate the somewhat unsightly bends and crooks in the tubes at these points.

Having thus described my invention, what I claim, and desire to secure by Letters Patent, is—

1. Pneumatic tubes for use in stores, &c., for conveying cash boxes or carriers or other packages, said tubes being made of glass or other transparent material, as set forth.

2. In devices for opening and closing the exit and entrance ports of pneumatic tubes, a sliding plate adapted to cover the opening in the tube, provided with an arm which projects into the tube, against which the carrier is forced to push the plate back and open the port, in combination with a spring adapted to operate on the plate in a reverse direction, to close the port after the carrier has been discharged from the tube, as set forth.

3. The sliding plate G, secured to the pivoted plate I by means of rods H, and provided with a spring-arm, M, in combination with the bars K, spring L, and tube C, provided with an aperture, F, as set forth.

In testimony whereof I affix my signature in presence of two witnesses.

W. G. DAVIS.

Witnesses:
J. ALF. HAYWARD,
L. W. SINSABAUGH.